(12) United States Patent
Zawacki et al.

(10) Patent No.: US 9,019,088 B2
(45) Date of Patent: Apr. 28, 2015

(54) MODULATION OF HAPTIC FEEDBACK

(75) Inventors: Jennifer Greenwood Zawacki, Hillsborough, NC (US); Scott Edwards Kelso, Cary, NC (US); Axel Ramirez Flores, Cary, NC (US); Howard Locker, Cary, NC (US); John Weldon Nicholson, Holly Springs, NC (US); John Miles Hunt, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 184 days.

(21) Appl. No.: 13/537,883

(22) Filed: Jun. 29, 2012

(65) Prior Publication Data
US 2014/0002248 A1    Jan. 2, 2014

(51) Int. Cl.
*H04B 3/36* (2006.01)
*G06F 3/01* (2006.01)

(52) U.S. Cl.
CPC ..................... *G06F 3/016* (2013.01)

(58) Field of Classification Search
CPC .................. G08B 6/00; G06F 3/016
USPC ....................................... 340/407.1
See application file for complete search history.

(56) References Cited

U.S. PATENT DOCUMENTS

| | | | |
|---|---|---|---|
| 2008/0059138 A1* | 3/2008 | Tremblay et al. | 703/11 |
| 2010/0245237 A1* | 9/2010 | Nakamura | 345/156 |
| 2011/0248916 A1* | 10/2011 | Griffin et al. | 345/157 |
| 2012/0229264 A1* | 9/2012 | Company Bosch et al. | 340/407.1 |

* cited by examiner

*Primary Examiner* — Kerri McNally
(74) *Attorney, Agent, or Firm* — John L. Rogitz; John M. Rogitz

(57) ABSTRACT

The subject disclosure is directed towards a technology by which a device includes one or more haptic feedback mechanisms that may be operated in a controlled manner to output amplitude-controlled vibrations. In one aspect, the vibrations from at least two haptic feedback mechanisms are combined, providing different amplitudes at different device locations. In one aspect, a haptic feedback mechanism outputs vibrations with a one amplitude in one state, and another, different amplitude in at least one other state, as controlled by the controller. The different states may correspond to different weights being driven at different times, and/or different positions of one or more weights.

19 Claims, 6 Drawing Sheets

MODULATION OF HAPTIC FEEDBACK

BACKGROUND

Some contemporary computing (including communication) devices use vibration to provide haptic feedback to users, such as haptic feedback in conjunction with user interaction, or to signal a user of some event such as an incoming communication, game event, and so forth. A typical way that this is accomplished is by energizing a motor that is coupled to an eccentrically positioned weight.

In some situations, the amount of haptic feedback can change. For example, when playing a game, a faster or slower pulsing sensation may convey a sense of urgency or unease with respect to some game playing situation that the user is currently experiencing. To this end, the device increases or decreases the motor's rotational frequency such that the weight spins faster or slower.

The haptic feedback is thus based on the rotational frequency, and is essentially directed to some target vibration area of the device such that the feedback is typically sensed relatively uniformly. Thus, outputting haptic feedback on contemporary devices is relatively limited with respect to the amount of information that is able to be conveyed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a device that is configured for user interaction includes one or more haptic feedback mechanisms. A controller operates the one or more haptic feedback mechanisms to output amplitude-controlled vibrations.

In one aspect, the controller controllably drives a plurality of haptic feedback mechanisms at the same time and/or in a pattern to combine vibrations from at least two haptic feedback mechanisms. The combination provides amplitude-controlled vibrations having different amplitudes at different locations on the device. The controller may drive at least two haptic feedback mechanisms to combine vibrations from each to provide amplitude-controlled vibrations having different amplitudes at different times.

In one aspect, at least one haptic feedback mechanism may be configured to individually output vibrations with a first amplitude in one state, and output vibrations with at least one different amplitude in at least one other state, as controlled by the controller. The different states may correspond to different weights being driven at different times, and/or different positions of one or more weights.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using haptic feedback to convey information to a device user, in which haptic feedback amplitude, which may be combined with frequency control/modulation, is controllably varied (modulated) to determine the amount of haptic feedback that is sensed by a user.

In one aspect, multiple haptic feedback output mechanisms are positioned at various positions within a device. By controlling which one or ones of the haptic feedback output mechanisms are operated at what time (e.g., dependent on current circumstances), each of which also may include independently controlled amplitude and/or frequency modulation, overlapping vibrational waves can create areas of stronger feedback and weaker feedback on a device. For example, by controlling the multiple mechanisms, a user who is touching a device screen may sense stronger feedback when closer to a particular screen location than when further from that location.

In another aspect, a haptic feedback output mechanism includes a motor configured to drive one or more weights, in which the number of weights driven at any time, as well as the rotational frequency, may be controlled by device control logic (e.g., software, firmware and/or hardware). Other parameters such as the relative position of the weight weights may be controlled. This allows for creating a variance in haptic feedback amplitude, (as well as frequency if desired).

It should be understood that any of the examples herein are non-limiting. For example, the technology described herein applies to any computing, communication and/or other devices that are capable of conveying information via haptic feedback. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in providing information via user feedback in general.

Figure 1A:
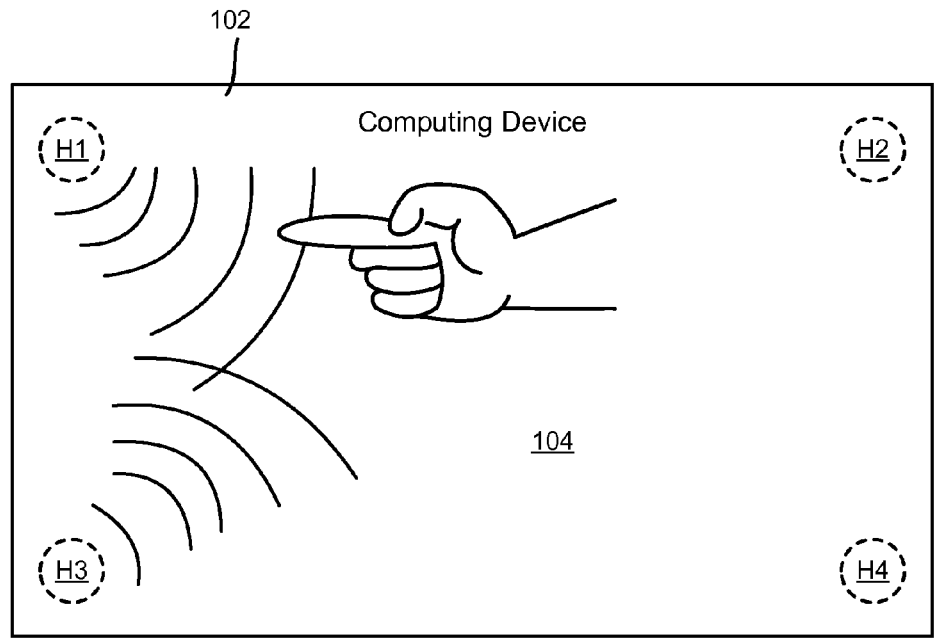
FIG. 1A is a representation of a computing device configured with multiple haptic feedback output mechanisms according to one example embodiment.

FIG. 1A shows an example combined haptic feedback implementation in which a computing device 102 includes a plurality of haptic feedback output mechanisms, H1-H4 in this example, positioned at relative areas behind a touch-sensitive display screen 104. Note that while four generally symmetrically positioned haptic feedback output mechanisms H1-H4 are shown in FIG. 1A, this is only an example, and one or more of such haptic feedback output mechanisms may be asymmetrically positioned relative to one another. Further, as will be understood, for providing haptic feedback in which amplitude varies based upon combinations of vibrations, in alternative implementations, as few as two such haptic feedback output mechanisms may be used, up to any practical number.

The haptic feedback output mechanisms H1-H4 may be generally the same with respect to their amplitude capabilities and other characteristics, such as based on the same size motor, maximum frequency and size/weight/shape/position and the like of the weight that is driven to provide the haptic feedback. However any or all of these characteristics may differ among the haptic feedback output mechanisms H1-H4. For example, in a device having two haptic feedback output mechanisms, one mechanism may have a heavier weight (or set of weights) than the other mechanism. Further, as described below, individual amplitudes may be controllably varied among haptic feedback output mechanisms.

As can be readily appreciated, in the example of FIG. 1A, a more intense vibration may be sensed as the user moves a finger from a haptic feedback output mechanism driven with less amplitude (and/or a different rotational frequency) towards a haptic feedback output mechanism driven with more amplitude (and/or a different rotational frequency). However, even if the amplitudes and/or rotational frequencies are identical, different finger positions may result in different haptic feedback being sensed.

More particularly, vibrational waves add and subtract from each other, and thereby the output of a plurality of haptic feedback output mechanisms may be controlled so as operate at a common time to go in and out of phase with respect to combined amplitudes based upon location; different screen (or other device) positions thus may correspond to different amplitudes. On and off timing also may be used, e.g., in a controlled pattern to combine vibrations. Further, acoustic-like beats may result from the haptic feedback output mechanisms being controllably driven with slightly different frequencies, for example. This combination of vibrational waves from a plurality of haptic feedback output mechanisms thus facilitates any number of ways to controllably convey information to a user.

Figure 1B:
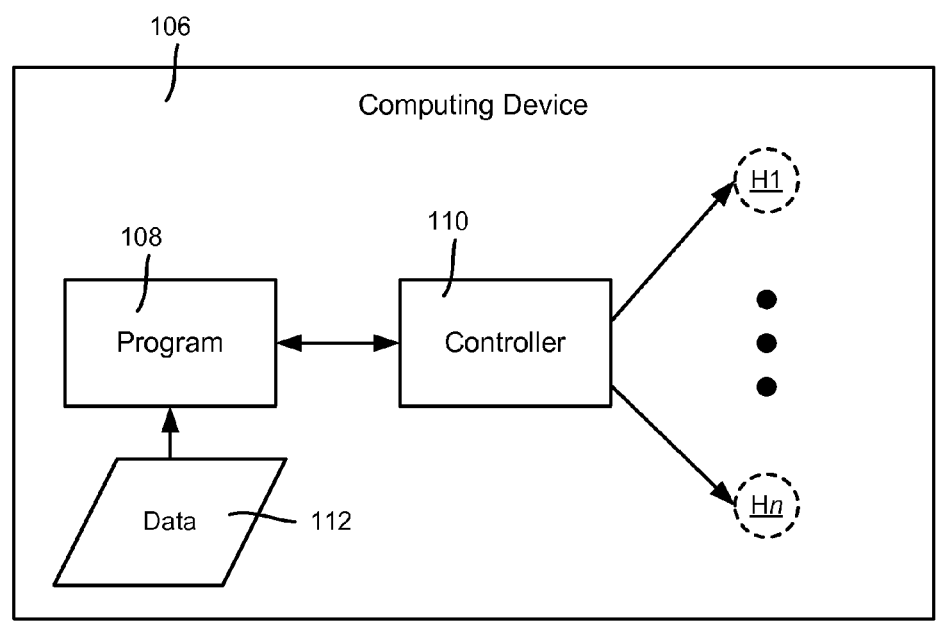
FIG. 1B is a block diagram showing components of an example computing device configured with multiple haptic feedback output mechanisms according to one example embodiment.

FIG. 1B represents an implementation showing internal components of an example computing device 106 configured with any number of multiple haptic feedback output mechanisms H1-Hn. A program 108 instructs a controller 110, which may include or be coupled to driving circuitry and the like, when to drive one or more of the haptic feedback output mechanisms H1-Hn. The program 108 may, for example, instruct the controller 110 by providing parameters or other data signals via a suitable interface or the like. For example, a controller may comprise an operating system component that various application programs or other operating system components, logic, middleware and so forth may communicate with to output desired haptic feedback.

The program 108 may do so based upon its own internal state, (e.g., a game situation), and/or based upon other data 112, such as the current screen coordinates of the user's finger. The program 108 also may request a different driving frequency for driving each of the haptic feedback output mechanisms H1-Hn. Further, as described herein, the program 108 also may request a different driving amplitude for any haptic feedback output mechanism that is capable of providing different amplitudes, such as by weight/position changes.

Figure 2A:
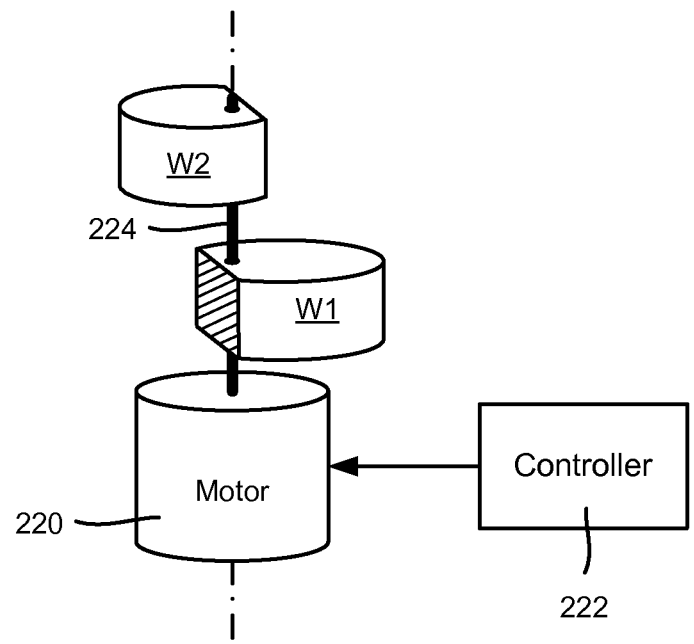
FIGS. 2A and 2B comprise representations of an example haptic feedback output mechanism controlled to change haptic feedback amplitude based upon using motor rotation direction to change weight according to one example embodiment.
Figure 2B:
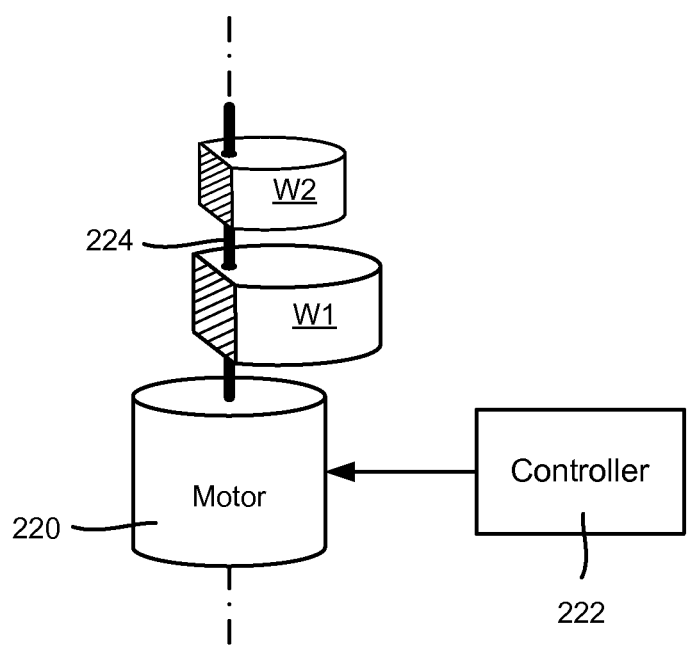

FIGS. 2A and 2B show an example of how amplitude may be varied by a haptic feedback output mechanism by changing the amount of weight rotated, in addition to or instead of combined vibrational wave-based haptic feedback (and/or frequency-controlled haptic feedback). In FIG. 2A, a motor 220 is configured and controlled by a controller 222 to selectively drive one weight W1 and/or W2; (note that the weights W1, W2 and motor 220 as depicted are not intended to represent any particular scale/positioning, and can be larger or smaller, closer to or further from each other than depicted, and so forth, for example). Further, note that the weights W1 and W2 may be the same weight, size, offset, shape and/or the like as one another, but need not be the same in any or all of such characteristics. Still further, more than two weights may be used, as will become readily apparent.

In the example(s) of FIGS. 2A and 2B, consider that the motor 220 is configured with a shaft 224 that is always engaged with the weight W1, and couples to weight W2 only when the shaft spins in one direction of rotation, such as clockwise. Thus, the motor 220 rotates only the weight W1 when the shaft 224 spins in one direction of rotation, (e.g., counterclockwise), and rotates both weights W1 and W2 when the shaft 224 spins in the other direction of rotation, (e.g., clockwise). Many well-known mechanical mechanisms such as a pawl may be used to engage the motor shaft (or a component coupled thereto) with the weight W2 in one direction but allow the shaft to spin without engaging the weight W2 in the other direction, and such mechanisms are not described in detail herein.

Further, as represented in FIG. 2B, such a mechanical mechanism (or another mechanism, such as magnet-based element) can keep the weights W1 and W2 in a desired alignment relative to one another when both are rotating together. In the example of FIG. 2B, the weights W1 and W2 align when rotated together to provide more eccentricity.

Thus, in the example of FIGS. 2A and 2B, controllably selecting the direction of shaft spinning determines the amplitude. Such control is represented by the controller 222.

Figure 3A:
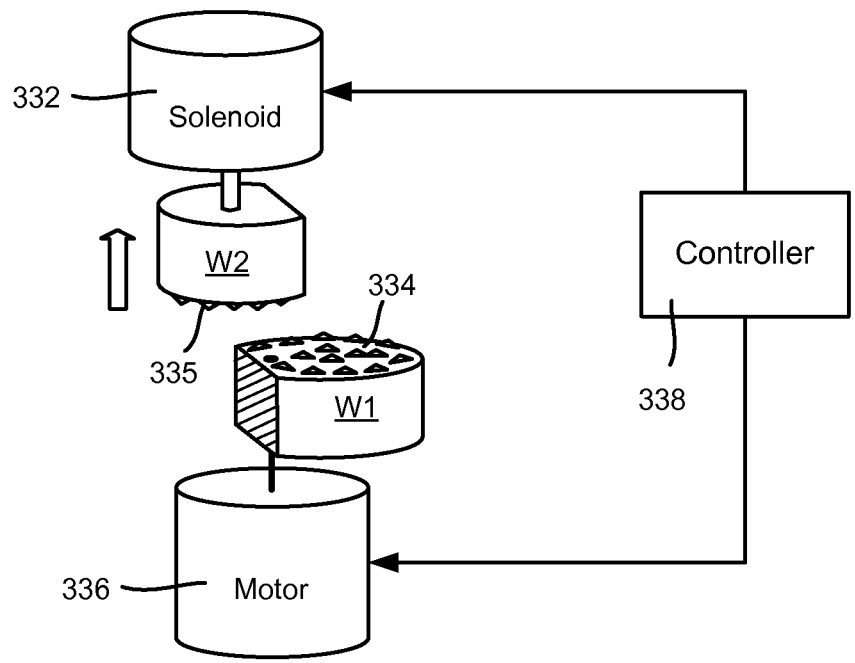
FIGS. 3A and 3B comprise representations of an example haptic feedback output mechanism controlled to change haptic feedback amplitude based upon energizing and de-energizing a solenoid to change weight according to one example embodiment.
Figure 3B:
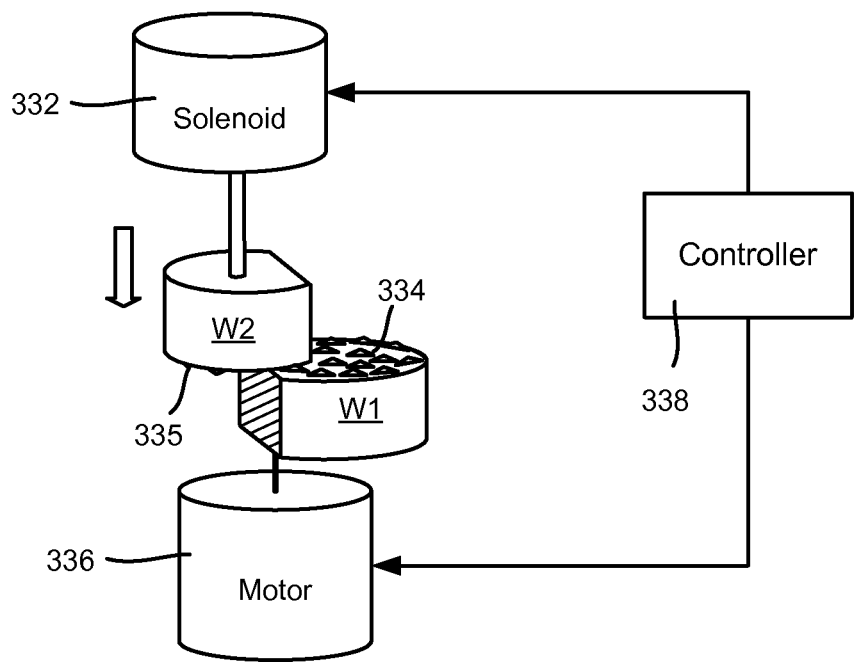

FIGS. 3A and 3B show another example embodiment, in which two weights W1 and W2 disengage (FIG. 3A) or engage (FIG. 3B) with one another by relative (e.g., linear) motion, such as operated by an electromechanical mechanism, e.g., a solenoid 332. In this example, teeth 334 and 335 (or gears or the like) that mesh when the weights are in physical contact with one another may be used to couple the weights together, as may using materials that provide sufficient friction. Other coupling mechanisms may be used. For example, one weight may comprise an electromagnet that when energized couples magnetically to the other weight, and decouples (e.g., via an opposing spring or reverse polarity or the like) when not energized.

In the exemplified embodiment of FIGS. 3A and 3B, the weight W1 is coupled to the shaft of the motor 336 and rotates as the motor runs. Energizing the solenoid 332 moves the weight W2 into contact with the weight W1 (e.g., so the teeth 334 and 335 mesh), whereby both rotate together, providing increased amplitude with respect to haptic feedback. Note that the teeth or the like may be configured to mesh such that the weights W1 and W2 become aligned as desired as they begin rotating together. Further, note that in alternative embodiments, a solenoid may be positioned to instead move the weight that is coupled to the motor shaft, W1 in this example, (or possibly both weights to some extent), and may be oriented such that the weights are pulled together instead of pushed together.

Alternatively, instead of the weights couple to one another, the solenoid may move the motor/shaft up and down to engage with one weight, the other weight, or both weights. Thus, for example, if a linear motion is combined with the rotational direction engagement solution described above with respect to FIGS. 2A and 2B, with the solenoid in one (e.g., de-energized) state, the motor may be used to spin only one weight in one rotational direction, and only the other weight in the other rotational direction. However, when the solenoid is in the other (e.g., energized) state, both weights may rotate together in this example. Thus, three amplitudes may be provided by using configurations with different characteristics, e.g., a first weight in one direction, a second weight in the other direction, and a total (first plus second) weight in that other direction when the solenoid is also energized.

Figure 4A:
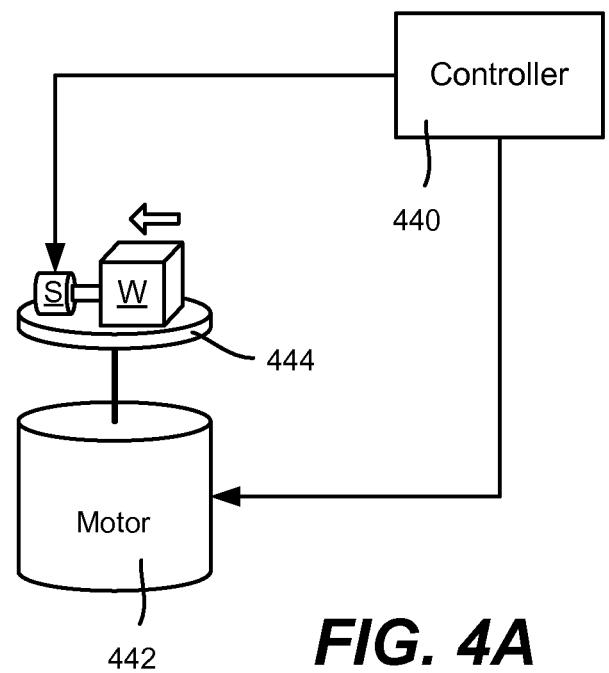
FIGS. 4A and 4B comprise representations of an example haptic feedback output mechanism controlled to change haptic feedback amplitude based upon energizing and de-energizing a solenoid to change a weight's position according to one example embodiment.
Figure 4B:
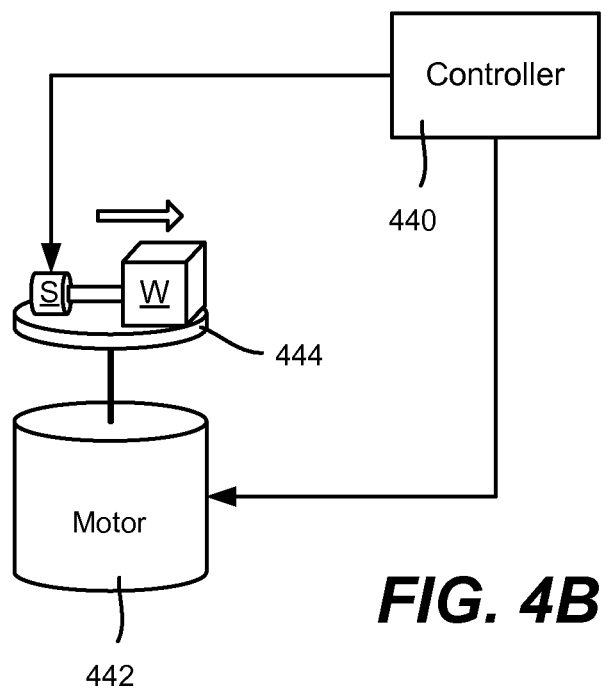

In another example alternative, a single weight may be moved to vary the amplitude, e.g., by varying the eccentricity. In the example of FIGS. 4A and 4B, a controller 440 controls a motor 442 and a solenoid S, such as mounted to a rotating disc 444 or the like. Via control of the solenoid S, a weight W is moved to change its position on the disc 444 and thereby vary the amplitude by varying the eccentricity/offset when rotated.

Note that the solenoid alternatively may itself serve as the weight, e.g., the solenoid body may be pushed against/pulled towards a fixed support or the like. This may be visualized by considering the solenoid body (possibly augmented with some further weight) to be represented by W and the fixed support to be represented by S in FIGS. 4A and 4B; (the controller would be coupled to W in this alternative).

Further note that instead of a solenoid that extends or retracts depending on whether energized or not, an alternative mechanism such as a servo-motor may be controlled to position a weight (or position itself if serving as the weight) to a desired position. In this way, the eccentricity may be varied in a more fine-grained manner.

Figure 5:
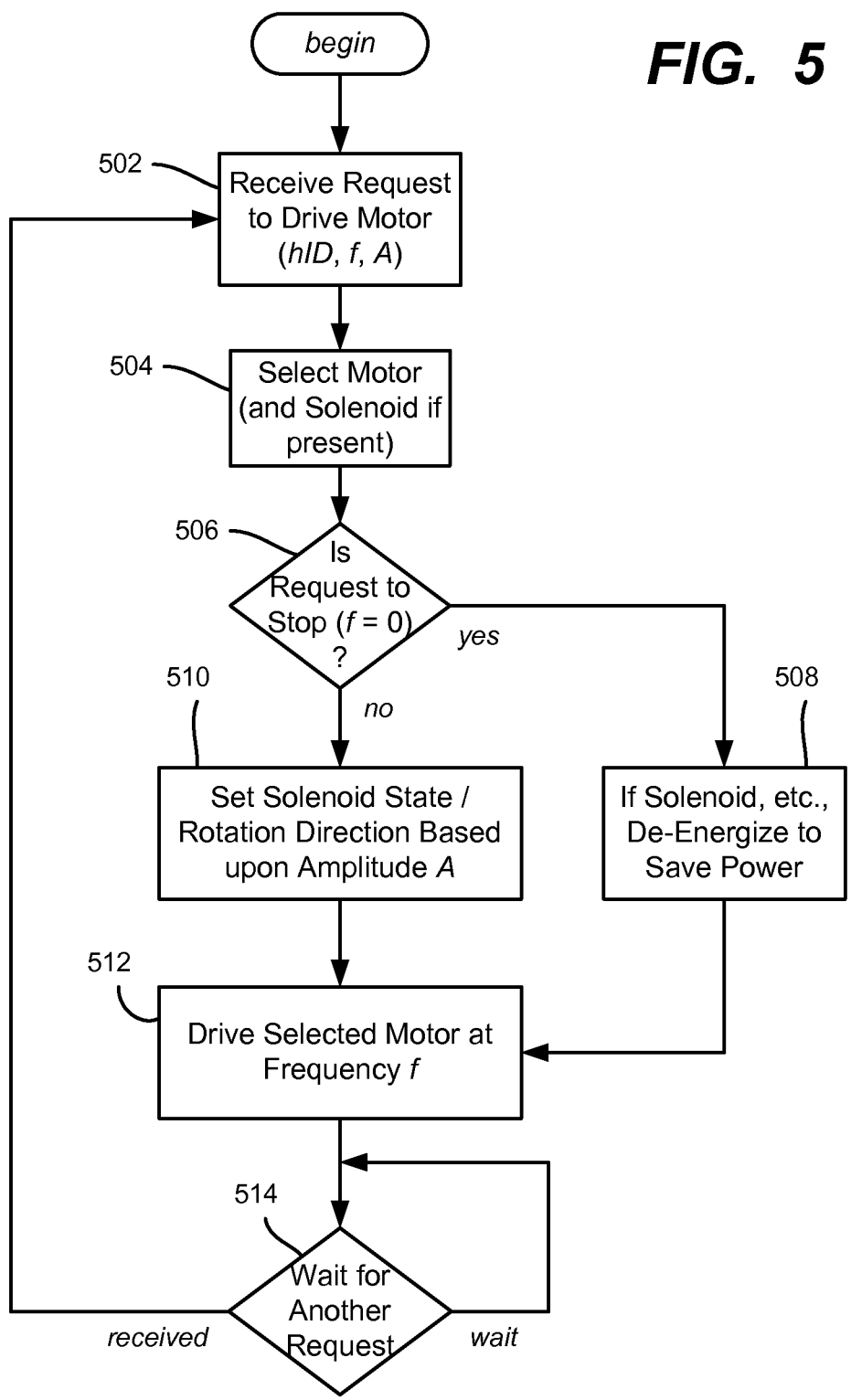
FIG. 5 is a flow diagram representing example steps of a controller for selectively changing haptic feedback amplitude according to one example embodiment.

FIG. 5 is a flow diagram representing example operations of an example controller, such as based upon instructions from a program. In this example, consider that a device includes a plurality of motors and/or at least one motor that may change amplitude, such as by rotational direction change and/or weight engagement; frequency also may be controllably changed.

Step 502 represents receiving a request to control a motor's operation. In a device having multiple motors, the request may include a haptic feedback mechanism identifier hID, a rotational frequency f, and an amplitude value A. In a device having only one motor, a frequency and amplitude may be provided. Various rules may be used to handle legacy programs that are not configured to request different amplitudes, e.g., a default amplitude may be used, only one mechanism may be driven if multiple mechanisms exist but no ID is provided, and so on.

Depending on the type of haptic feedback mechanism, the amplitude value A may be a binary value (e.g., zero for lower amplitude, one for higher), or some other set of values for finer-grained amplitude control. Note that in this example, a rotational frequency value f of zero means to turn the motor off; a minimum rotational frequency (when not off) and maximum rotational frequency may be enforced by the controller, or possibly the motor.

Step 504 represents selecting the motor, e.g., based upon the haptic feedback mechanism identifier hID, and selecting the solenoid, if a solenoid is present with this type of mechanism. This may include taking actions to couple an appropriate voltage via a switch or the like to the motor and solenoid (if any).

Step 506 evaluates whether the request is to stop an existing vibration from continuing, e.g., requesting that a motor be driven with zero frequency. If so, and if a solenoid and/or other electromechanical/electromagnetic component is energized, step 508 is executed to turn the energized state to a de-energized state so as to conserve device power. If the request is to stop an existing vibration from continuing and there is no such other component or components (other than the motor) energized, step 506 can branch ahead to step 512 as described below.

Step 510 represents setting the solenoid state or changing the rotational direction such as via a switch (or both) based upon the amplitude A. This step may be more fine-grained as described above.

Step 512 represents driving the selected motor at the desired rotational frequency. As described above, this may be to turn off vibration, e.g., with a frequency of zero. Note that step 512 may start before step 510 completes, e.g., the rotation may start before the weights engage; alternatively some delay may be built into step 512 to allow for engagement as appropriate for a given mechanism, e.g., to reduce wear and tear on the components.

Step 514 represents waiting for another request, which may be already pending. When received, step 514 returns to step 502 to handle this next request. Note that at least some of the steps of FIG. 5 may be performed in parallel, e.g., for controlling different haptic feedback output mechanisms, and that the ordering of some of the steps may differ from the example steps shown.

Example Environment

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 6:
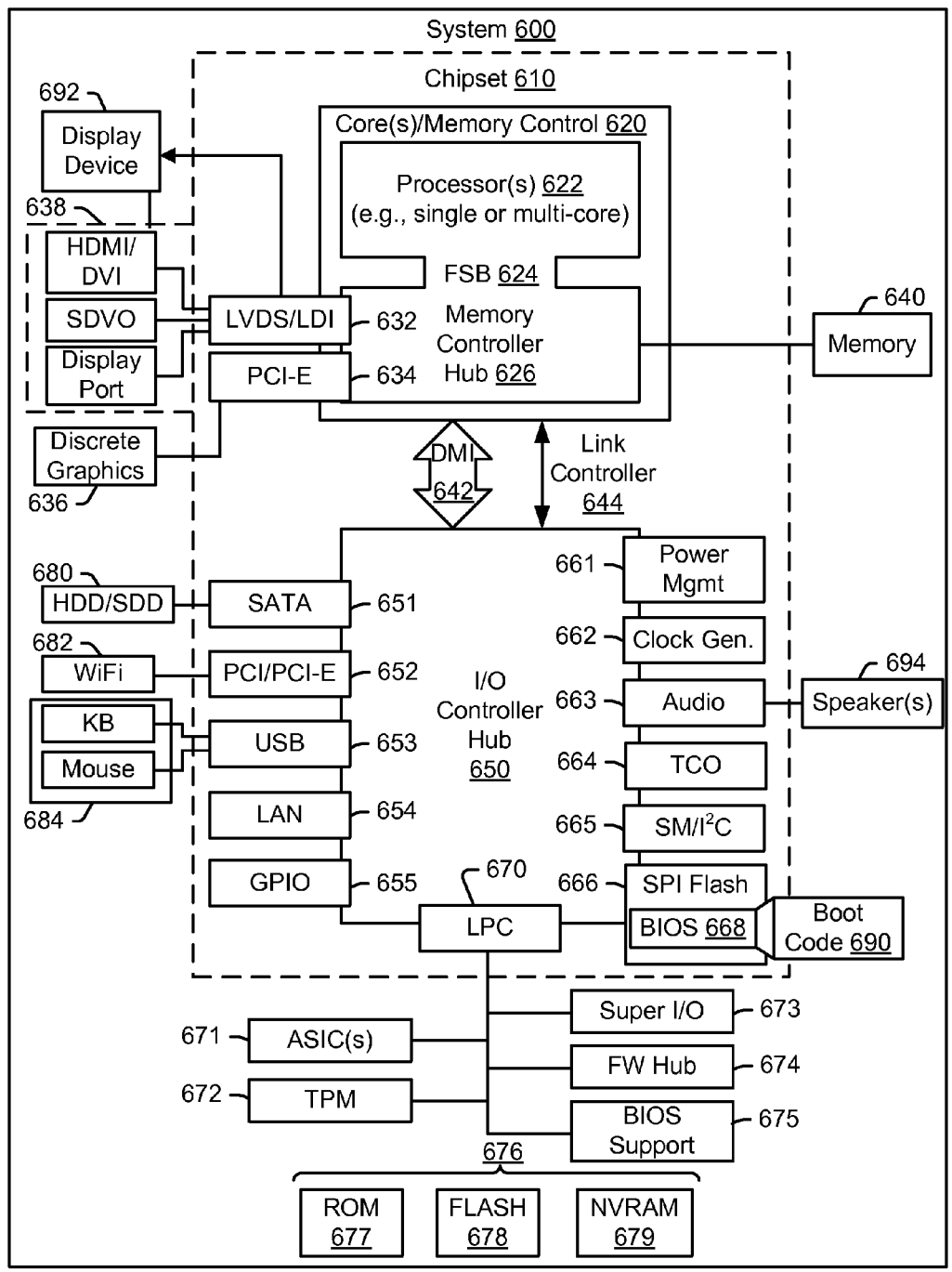
FIG. 6 is a block diagram representing an example computing environment into which aspects of the subject matter described herein may be incorporated.

While various example circuits or circuitry are discussed, FIG. 6 depicts a block diagram of an illustrative example computer system 600. The system 600 may be a laptop, tablet or desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 600.

The system 600 of FIG. 6 includes a so-called chipset 610 (a group of integrated circuits, or chips, that work together, chipsets) with an architecture that may vary depending on manufacturer (e.g., INTEL®, AMD®, etc.). The architecture of the chipset 610 includes a core and memory control group 620 and an I/O controller hub 650 that exchange information (e.g., data, signals, commands, etc.) via a direct management interface (DMI) 642 or a link controller 644. In FIG. 6, the DMI 642 is a chip-to-chip interface (sometimes referred to as being a link between a "northbridge" and a "southbridge"). The core and memory control group 620 include one or more processors 622 (e.g., single or multi-core) and a memory controller hub 626 that exchange information via a front side bus (FSB) 624; noting that components of the group 620 may be integrated in a chip that supplants the conventional "northbridge" style architecture.

In FIG. 6, the memory controller hub 626 interfaces with memory 640 (e.g., to provide support for a type of RAM that may be referred to as "system memory"). The memory controller hub 626 further includes a LVDS interface 632 for a display device 692 (e.g., a CRT, a flat panel, a projector, etc.). A block 638 includes some technologies that may be supported via the LVDS interface 632 (e.g., serial digital video, HDMI/DVI, display port). The memory controller hub 626 also includes a PCI-express interface (PCI-E) 634 that may support discrete graphics 636.

In FIG. 6, the I/O hub controller 650 includes a SATA interface 651 (e.g., for HDDs, SDDs, etc.), a PCI-E interface 652 (e.g., for wireless connections 682), a USB interface 653 (e.g., for input devices 684 such as keyboard, mice, cameras, phones, storage, etc.), a network interface 654 (e.g., LAN), a GPIO interface 655, a LPC interface 670 (for ASICs 671, a TPM 672, a super I/O 673, a firmware hub 674, BIOS support 675 as well as various types of memory 676 such as ROM 677, Flash 678, and NVRAM 679), a power management interface 661, a clock generator interface 662, an audio interface 663 (e.g., for speakers 694), a TCO interface 664, a system management bus interface 665, and SPI Flash 666, which can include BIOS 668 and boot code 690. The I/O hub controller 650 may include gigabit Ethernet support.

The system 600, upon power on, may be configured to execute boot code 690 for the BIOS 668, as stored within the SPI Flash 666, and thereafter processes data under the control of one or more operating systems and application software (e.g., stored in system memory 640). An operating system may be stored in any of a variety of locations and accessed, for example, according to instructions of the BIOS 668. As described herein, a device may include fewer or more features than shown in the system 600 of FIG. 6.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A device, comprising:
   a screen;
   a plurality of haptic feedback mechanisms spaced about the screen at a plurality of locations; and
   a controller which controllably operates each haptic feedback mechanism of the plurality of haptic feedback mechanisms to output a respective amplitude-controlled vibration at each location of the plurality of locations;
   wherein at least one of the plurality of haptic feedback mechanisms comprises at least two weights and a motor operated by the controller, wherein the motor is operated by the controller to selectively output vibration at a first amplitude by rotating a first weight in a first state, and at a second amplitude different from the first amplitude by rotating the first weight and a second weight in a second state; and
   wherein the device comprises an electromechanical mechanism operated by the controller, wherein the electromechanical mechanism is operated to couple the first weight and the second weight to one another for rotating both the first weight and the second weight in the second state.

2. The device of claim 1, wherein the controller controls the plurality of haptic feedback mechanisms to combine vibration from at least two haptic feedback mechanisms to provide vibration having different amplitudes at different locations on the screen.

3. The device of claim 1, wherein the controller controls at least two haptic feedback mechanisms to combine vibration from each haptic feedback mechanism of the at least two haptic feedback mechanisms to provide vibration having different amplitudes at different times.

4. The device of claim 1, wherein the controller operates the motor in a first direction to rotate the first weight in the first state, and operates the motor in a second direction to rotate the first weight and a second weight in the second state.

5. The device of claim 1, wherein the electromechanical mechanism comprises a solenoid.

6. The device of claim 1, wherein the motor is operated by the controller to output vibration at the first amplitude by rotating the first weight as moved into one position by the electromechanical mechanism, and to output vibration at the second, different amplitude by rotating the first weight as moved into another position by the electromechanical mechanism.

7. A device, comprising:
   a display that comprises a plurality of locations;
   at least one vibration producing mechanism juxtaposed at least adjacent to the display to produce a vibration at the display, the at least one vibration producing mechanism comprising at least a first weight, a second weight, and a motor;
   a processor which operates the at least one vibration producing mechanism to produce a vibration, wherein the motor is operated by the processor to produce vibration at a first amplitude by rotating the first weight in a first instance, and wherein the motor is operated by the processor to produce vibration at a second amplitude different from the first amplitude by rotating the first weight and the second weight in a second instance; and
   at least one element operable to couple the first weight and the second weight together for rotation of both the first weight and the second weight in the second instance.

8. The device of claim 7, wherein the processor determines at least one vibration frequency.

9. The device of claim 7, comprising plural vibration producing mechanisms, wherein the processor operates the plural vibration producing mechanisms to output haptic feedback at each location of the plurality of locations, wherein vibration from a first vibration producing mechanism add to and subtract from vibration of at least a second vibration producing mechanism to vary respective amplitudes of the haptic feedback at different locations on the display.

10. The device of claim 7, wherein the processor receives data from at least one program executing at the device and operates the vibration producing mechanism based upon the data to output vibration at the first amplitude in the first instance and at the second amplitude different from the first amplitude in the second instance.

11. The device of claim 10, wherein the motor rotates a first amount of weight in the first instance and a second amount of weight different from the first amount of weight in the second instance.

12. The device of claim 10, wherein the motor rotates the first weight in one position in the first instance and in a different position in the second instance.

13. The device of claim 7, wherein at least one of the first weight and the second weight is linearly moveable with respect to the other weight of the first weight and the second weight to change an amplitude of vibration at one or more locations of display.

14. The device of claim 7, wherein the at least one element comprises a solenoid.

15. A method, comprising:
providing as display that comprises a plurality of locations;
providing at least one vibration producing mechanism juxtaposed at least adjacent to the display to produce a vibration at the display, the at least one vibration producing mechanism comprising at least a first weight, a second weight, and a motor;
providing a controller which operates the at least one vibration producing mechanism to produce a vibration, wherein the motor is operated by the controller to produce vibration at a first amplitude by rotating the first weight in a first instance, and wherein the motor is operated by the controller to produce vibration at a second amplitude different from the first amplitude by rotating the first weight and the second weight in a second instance; and
providing at least one element operable to engage the first weight with the second weight for rotation of the first weight and the second weight in the second instance.

16. The method of claim 15, wherein the controller varies eccentricity of at least one component of at least one vibration producing mechanism to provide vibration at different amplitudes.

17. The method of claim 15, wherein controller varies an effective weight for at least one vibration producing mechanism to provide vibration at different amplitudes.

18. The method of claim 15, comprising:
providing plural vibration producing mechanisms, wherein the controller controls vibration from plural vibration producing mechanisms at a common time.

19. The method of claim 15, wherein the at least one element comprises a solenoid.

* * * * *